(12) United States Patent
Rothschild et al.

(10) Patent No.: US 10,135,901 B2
(45) Date of Patent: *Nov. 20, 2018

(54) EXCHANGE OF CONTENT CONSUMPTION-RELATED INFORMATION BETWEEN NETWORKED DEVICES

(71) Applicant: COX COMMUNICATIONS, INC., Atlanta, GA (US)

(72) Inventors: Keith Alan Rothschild, Dunwoody, GA (US); Slavisha Karach, Alpharetta, GA (US); Muhammad Asif Raza, Norcross, GA (US); Daniel J. Geist, Dunwoody, GA (US); Donald Carl Bleyl, Powder Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/843,797

(22) Filed: Mar. 15, 2013

(65) Prior Publication Data

US 2014/0280761 A1   Sep. 18, 2014

(51) Int. Cl.
   *G06F 15/173* (2006.01)
   *H04L 29/08* (2006.01)

(52) U.S. Cl.
   CPC .............. *H04L 67/02* (2013.01); *H04L 67/22* (2013.01); *H04L 67/2842* (2013.01); *H04L 67/327* (2013.01)

(58) Field of Classification Search
   CPC ..... G06Q 50/01; H04L 29/06; H04L 29/0809; H04L 67/02; H04L 67/22; H04L 67/2842; H04L 67/327

USPC ...................... 707/770, 3; 715/748; 370/503; 709/224, 217, 203
See application file for complete search history.

(56) References Cited

U.S. PATENT DOCUMENTS

| | | | |
|---|---|---|---|
| 8,359,310 B1* | 1/2013 | Frank | H04L 51/36 707/724 |
| 9,306,984 B2* | 4/2016 | Choi | H04L 65/80 |
| 2007/0050500 A1* | 3/2007 | Rim et al. | 709/224 |
| 2008/0016177 A1* | 1/2008 | Jin et al. | 709/217 |

(Continued)

*Primary Examiner* — Dhairya A Patel
(74) *Attorney, Agent, or Firm* — Eversheds Sutherland (US) LLP

(57) ABSTRACT

Content information networks may be provided that may each include a plurality of content consumption devices. One or more of the content consumption devices within a content information network may be capable of serving as a content consumption hub device that coordinates the receipt and dissemination of content consumption event information pertaining to content consumption events from and to various content consumption devices within the content information network. The content consumption hub device may further communicate, to various content consumption devices within its network, content-related information relating to content consumed on content consumption devices within its network and/or devices outside of its network. The content consumption hub device may be configured to receive content-related information from one or more content information hubs. The content consumption hub device may also receive content consumption event information from a content consumption platform.

23 Claims, 8 Drawing Sheets

(56) References Cited

U.S. PATENT DOCUMENTS

| | | | |
|---|---|---|---|
| 2009/0089838 A1* | 4/2009 | Pino, Jr. | G06Q 30/02 725/40 |
| 2009/0138444 A1* | 5/2009 | Kim et al. | 707/3 |
| 2010/0115574 A1* | 5/2010 | Hardt | H04N 7/163 725/139 |
| 2011/0258049 A1* | 10/2011 | Ramer | G06F 17/30867 705/14.66 |
| 2011/0299835 A1* | 12/2011 | Fleming | H04N 5/77 386/280 |
| 2012/0177067 A1* | 7/2012 | Cho et al. | 370/503 |
| 2013/0268378 A1* | 10/2013 | Yovin | G06O 20/204 705/18 |
| 2013/0282793 A1* | 10/2013 | Swings et al. | 709/203 |
| 2014/0050459 A1* | 2/2014 | Mountanos | H04H 60/13 386/248 |
| 2014/0053078 A1* | 2/2014 | Kannan | 715/748 |
| 2014/0186014 A1* | 7/2014 | Wordley | H04N 19/40 386/345 |
| 2014/0282745 A1* | 9/2014 | Chipman | H04N 21/47214 725/61 |
| 2014/0289273 A1* | 9/2014 | Embert | G06F 17/30017 707/770 |

* cited by examiner

EXCHANGE OF CONTENT CONSUMPTION-RELATED INFORMATION BETWEEN NETWORKED DEVICES

BACKGROUND

Users may use a variety of types of devices to consume content such as audio content, video content, textual content, or combinations thereof. In our increasingly mobile-centric world, the consumption of content using mobile devices in particular (e.g., smartphones, tablet devices, etc.) has become increasingly more common.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1:
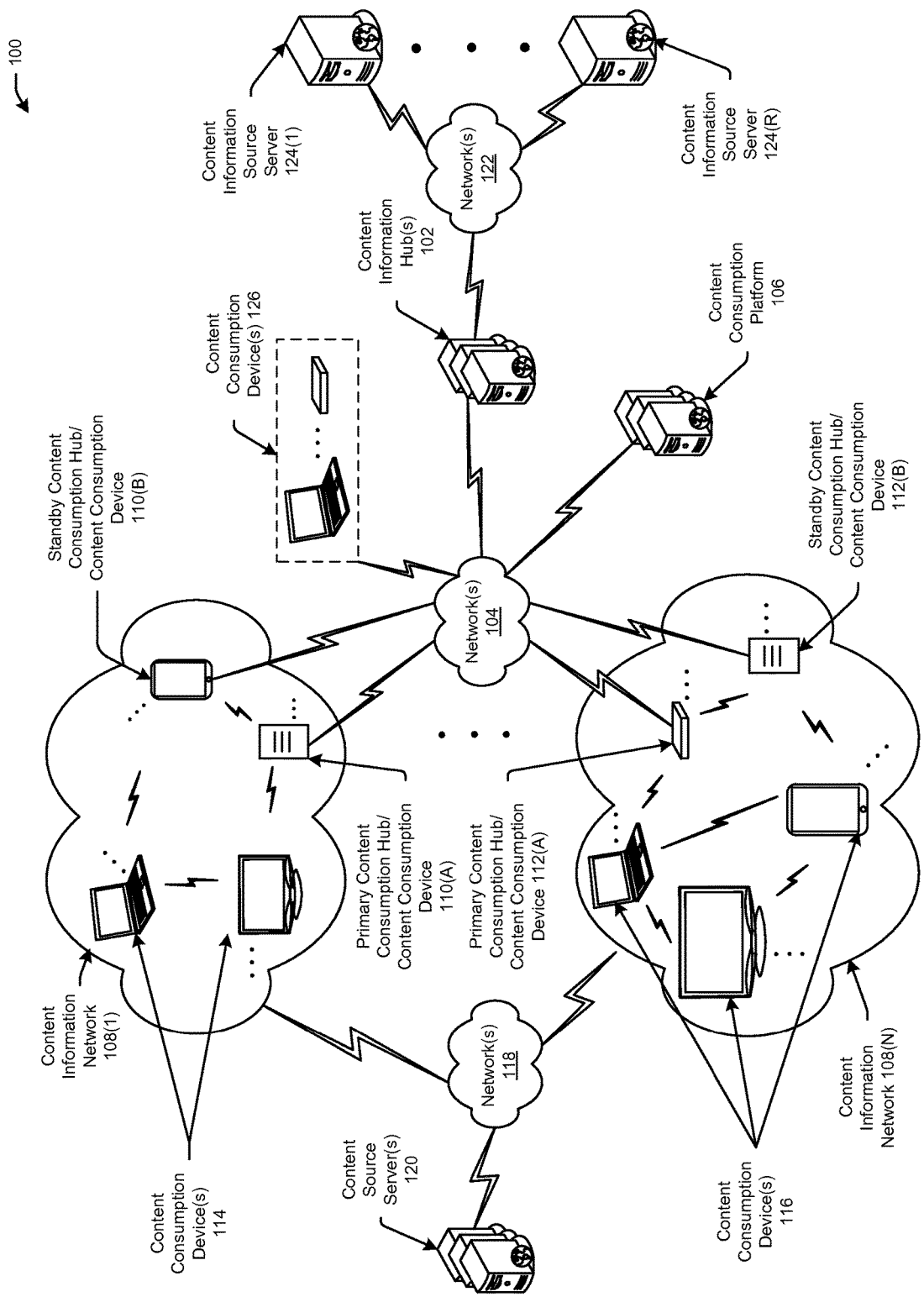
FIG. 1 is a schematic diagram of an illustrative system architecture for facilitating the exchange of content consumption-related information between content consumption devices forming part of various content information networks in accordance with one or more embodiments of the disclosure.

Embodiments of the disclosure relate to, among other things, systems, methods, computer-readable media, techniques and methodologies for facilitating the exchange of information relating to content consumption events associated with one or more content consumption devices.

More specifically, in one or more embodiments of the disclosure, information (which hereinafter may be referred to as "content consumption event information") that identifies one or more characteristics of a content consumption event associated with a content consumption device may be communicated from the content consumption device to a content consumption hub device. The content consumption device and content consumption hub device may form part of a same content information network. The content consumption hub device may support functionality for coordinating the receipt of content consumption event information from content consumption devices within its own content information network (and potentially content consumption event information pertaining to content consumption events associated with content consumption devices forming part of one or more other content information networks) as well as the dissemination of the content consumption event information among content consumption devices within its own content information network. In various embodiments, the content consumption hub device may also be a content consumption device having content consumption events associated therewith.

The content consumption hub device may further support functionality for communicating a request to one or more content information hubs for content-related information associated with content identified in received content consumption event information. Upon receipt of the content-related information from the content information hub(s), the content consumption hub device may communicate the information to one or more content consumption devices forming part of a same content information network. Upon receiving the content-related information, any particular content consumption device may present at least a portion of the information to a user of the device based on user setting(s) and/or device setting(s).

In one or more additional embodiments of the disclosure, a content consumption hub device may communicate content consumption event information received from a content consumption device to one or more other content consumption devices within its content information network. Upon receipt of content consumption event information by a content consumption device, the device may communicate a request for at least a portion of the content identified in the content consumption event information to one or more content source servers. Additionally, or alternatively, the content consumption device may communicate a request for content-related information relating to content identified in the content consumption event information to the content consumption hub device. The content consumption hub device may, in turn, communicate a request for the content-related information to the content information hub(s) and communicate information received therefrom to the requesting content consumption hub device and, optionally, one or more other content consumption hub devices within the content information network.

It should be noted that, throughout this disclosure, any particular device or component may be referred to interchangeably with or without inclusion of the term "content." For example, a "content consumption hub device" may be referred to interchangeably as a "consumption hub device." Similar alternative terminology may be used for a variety of other devices/components discussed herein.

A content consumption event may correspond to one or more user interactions with a consumption device which relate to content consumed or to be consumed on the consumption device. The content consumption event information may include any of a variety of types of information that identify one or more characteristics associated with a content consumption event. The consumption event information may include, for example, an identifier associated with a consumption device on which the content is consumed or will be consumed, an identifier associated with a user, an identifier associated with a user account, and so forth. The consumption event information may further include information relating to a time associated with consumption of the content as well as a content identifier such as, for example, a digital object identifier (doi), a unique identifier associated with motion picture or television program content (e.g., an entertainment identifier registry (eidr)), or any other identifier that uniquely identifies particular content.

Still further, the consumption event information may include event classification information that identifies a type or classification of the consumption event. For example, the event classification information may identify one or more types of consumption events including, but not limited to, scheduling of a recording to record and store content on a consumption device (e.g., a digital video recorder (DVR)); consumption of content; one or more user actions associated with user manipulation of the presentation of content on a consumption device (e.g., a pause action, a rewind or "go-back" action, a fast-forward or "skip-forward" action, etc.); a deletion of content; and so forth. The consumption event information may additionally include one or more content location identifiers that identify various portions of content that are associated with the consumption event (e.g., start and end times in the content that are associated with the consumption event).

The content that may be consumed on a consumption device may include any suitable content including, but not limited to, video content, audio content, textual content, graphical content, or any combinations thereof. A non-exhaustive list of example types of content that may be consumed on a consumption device may include documents, presentations, or the like that may include textual, graphical, audio, and/or video content; multimedia content such as movies, television shows, music, videos, etc.; interactive content such as single-user or multi-user games (e.g., games executable on mobile devices, video games executable on gaming consoles, etc.); content-related information or content that is related to other content that is being consumed on the same consumption device or a different consumption device (e.g., metadata associated with consumed content); content that is associated with one or more user events or requests (e.g., content requested by a user and transmitted to a user device, points of attraction information transmitted to a user device based on a geographical location identified by a user or associated with the user device, flight information associated with a user's travel schedule and transmitted to a user device operable by the user, etc.); and so forth.

It should be appreciated that the above examples of content that may be consumed on a consumption device, consumption events associated with content consumed or to be consumed on a consumption device, consumption event information associated with consumption events, and so forth are merely illustrative and not exhaustive and that numerous other examples are within the scope of this disclosure.

In accordance with one or more embodiments of the disclosure, one or more content information networks may be provided, with each content information network including a variety of types of consumption devices. The content information network(s) may each represent at least a partial virtual mesh network of consumption devices. As used herein, the term "virtual mesh network" may refer to any set of one or more networks of devices in which any device within the set of network(s) may communicate with one or more other devices in the network(s) according to one or more communication technologies, and in which certain device(s) within the set of network(s) may communicate with certain other device(s) within the set of network(s) via one or more intermediary devices. A content information network may be, in various embodiments, an ad-hoc or otherwise decentralized type of wireless network that does not rely on a preexisting infrastructure (e.g., a router or access point), but rather, a network where each node (e.g., consumption device) within the network is capable of participating in routing of data by forwarding data from one or more nodes in the network to one or more other nodes in the network. The determination as to which particular path between nodes is chosen for routing of data may be made dynamically based on network connectivity.

In various embodiments, a subset of the consumption devices within each content information network may be capable of serving as a consumption hub device that is configured to communicate with one or more content information hubs. For ease of explanation, embodiments of the disclosure may be described in the context of a single content information hub; however, it should be appreciated that multiple content information hubs may be provided, with each content information hub having direct connectivity to each consumption hub device or connectivity via one or more other content information hubs. Each consumption device within a content information network may be capable of reporting consumption event information to a consumption hub device within the network. Further, the consumption hub device may itself be a consumption device capable of gathering consumption event information relating to consumption events corresponding to content consumed or to be consumed on the consumption hub device.

In those embodiments in which multiple consumption devices within a content information network each support functionality for serving as a consumption hub device (based for example on connectivity to a content information hub), one or more prioritization criteria may be used to determine which device will act as the consumption hub device. The prioritization criteria may include any suitable criteria including, but not limited to, a signal strength or other metric indicative of the quality of the connection to the content information hub device, a predefined ordering that specifies an order in which devices are designated to serve as the consumption hub device, and so forth. In certain embodiments, a particular consumption device within a content information network may be designated to serve as a primary consumption hub device and one or more other consumption devices within the content information network may be designated to serve as standby or back-up consumption hub devices in the event that a connection quality between the primary consumption hub device and the content information hub degrades below a threshold level or the primary consumption hub device becomes otherwise incapable of serving as the consumption hub device.

In one or more embodiments, a respective instance of an application may be executable on each of the consumption devices in a content information network. The application may include various program modules that support respective functionality for detecting consumption events on a consumption device, gathering and communicating, to the consumption hub device, consumption event information relating to consumption events detected on the consumption device, facilitating receipt, from the consumption hub device, of consumption event information and/or other content-related information associated with content consumed on other consumption devices (e.g., metadata associated with the consumed content, information identifying or otherwise pertaining to content related to the consumed content, etc.), and controlling the presentation of received content-related information to a user of the content consumption device on which the particular instance of the application is executing.

Each instance of the application may further include one or more program modules that may only be executed or executable on the consumption device serving as the consumption hub device and that support functionality for receiving consumption event information from other consumption devices within the content information network, communicating requests to the content information hub for content-related information (e.g., content metadata) relating to content identified in consumption event information received by the consumption hub device, receiving the content-related information, and distributing the content-related information to respective instances of the application executing on consumption devices within the content information network. As previously described, in certain embodiments, information (e.g., consumption event information, content-related information, etc.) may be propagated from the consumption hub device to other consumption devices within the network via one or more intermediary devices within the network.

In certain embodiments, the content information network(s) may collectively represent part of a larger partial virtual mesh network whereby consumption devices forming part of one content information network may receive consumption event information and/or content-related information associated with consumption events occurring on consumption devices forming part of another content information network. The consumption hub device of a particular content information network may coordinate the receipt of consumption event information pertaining to content consumed or to be consumed on consumption devices forming part of other content information network(s) and/or content-related information relating to the content identified in the consumption event information, and may propagate the received forms of information to other consumption devices within the particular content information network.

As a non-limiting example, a consumption hub device of a particular content information network may communicate a request to the content information hub for consumption event information and/or content-related information (e.g., content metadata) associated with content consumed on consumption device(s) forming part of a different content information network. In certain embodiments, the request may be communicated in response to a request received from consumption device(s) within the same content information network as the consumption hub device and/or may be initiated independently by the consumption hub device. The requested consumption event information and/or content-related information may have been communicated to the content information hub by a consumption hub device forming part of the different content information network. In this manner, multiple content information networks may form part of a virtual mesh network whereby information can be exchanged between consumption devices in different content information networks via interaction between respective consumption hub devices of the networks and the content information hub.

Referring again to information exchange within any particular content information network, the one or more communication technologies according to which consumption devices within a content information network may communicate may include any suitable communication protocol, standard or technology including, but not limited to, a wireless local area network (WLAN) communication technology (e.g., any of a variety of Institute of Electrical and Electronics Engineers (IEEE) 802.11 wireless communication standards for exchanging data using radio waves as data carriers—also known as WiFi), a personal area network (PAN) communication technology (e.g., BLUETOOTH® wireless technology for exchanging data over short distances using short-wavelength radio transmissions), a Near Field Communication (NFC) technology for establishing radio communication between devices by bringing the devices into contact or close proximity with each other, and so forth. It should be appreciated that the above examples of communication technologies that may be utilized to enable communication between consumption devices forming part of a content information network are merely illustrative and that any suitable communication protocols, standards or technologies may be employed.

Each device within a content information network may be able to communicate with each other device within the network, potentially via one or more intermediary devices within the network. As a non-limiting example of the manner in which consumption devices may communicate within a content information network, a first consumption device forming part of a content information network may communicate with one or more other consumption devices in the same network (including a second consumption device) via a WiFi connection. The second consumption device may communicate with one or more additional consumption devices (including a third consumption device) within the network using a BLUETOOTH® connection. Accordingly, while the first consumption device may not be able to communicate with the third consumption device directly, the devices are nonetheless able to communicate using multiple device connections within the network that may be associated with different communication technologies. More specifically, in the illustrative example above, the first consumption device may be able to communicate information to the third consumption device by first communicating information to the second consumption device over the WiFi connection and then instructing the second consumption device to communicate the information to the third consumption device over the BLUETOOTH® connection. The third consumption device may communicate information to the first consumption device in a similar manner.

In one or more embodiments of the disclosure, a content consumption platform may also be provided. The content consumption platform may receive consumption event information indicative of consumption events occurring on consumption devices not forming part of a content information network and may communicate the received consumption event information to consumption hub devices of various content information networks. In certain embodiments, the content consumption platform may gather or otherwise receive consumption event information from various content service portals (e.g., a content delivery network (CDN), a switched digital video (SDV) network, a web server, etc.) and may make the information available to a consumption hub device via, for example, a pub-sub mechanism.

Upon receipt of consumption event information from the content consumption platform, a consumption hub device may communicate the consumption event information to other consumption devices within the content information network. In certain embodiments, a consumption device that receives the consumption event information, may communicate a request to the consumption hub device for content-related information relating to content identified in the consumption event information. In response to receipt of the request, the consumption hub device may request the content-related information from the content information hub, and upon receipt, communicate the information to one or more consumption devices within the network. In various embodiments, the consumption hub device may independently request content-related information relating to content identified in the consumption event information from the content information hub, and upon receipt, may communicate the information to consumption device(s) within the content information network.

Accordingly, the content consumption platform may provide a vehicle by which consumption devices within a content information network may receive consumption event information and/or content-related information associated with consumption events involving content consumed on consumption devices that are not part of content information network (e.g., not capable of reporting consumption event information to a consumption hub device). Such information may be relevant, for example, in those scenarios in which a consumption device within a content information network is used to control content consumption on a consumption device that is not within a content information network.

The content consumption platform may also be configured to communicate consumption event information to one or more analytics platforms such as, for example, a viewership information reporting platform, a recommendations engine, and so forth.

Various aspects of this disclosure have been described above through reference to illustrative embodiments. These and other aspects of the disclosure will be described in more detail through reference to the accompanying drawings in the detailed description that follows.

Illustrative Architecture

FIG. 1 is a schematic diagram of an illustrative system architecture 100 for facilitating the exchange of content consumption-related information between content consumption devices forming part of various content information networks in accordance with one or more embodiments of the disclosure.

The illustrative system architecture 100 may include one or more content information networks 108(1)-108(N), which may be referred to herein at times generically as content information network 108. As previously described, each of the content information network(s) 108(1)-108(N) may represent at least a partial virtual mesh network of content consumption devices wherein each device within the content information network 108 may communicate with one or more other devices in the network according to one or more communication technologies, and in which certain device(s) within the content information network 108 may communicate with certain other device(s) within the network via one or more intermediary devices. Each of the content information network(s) 108(1)-108(N) may be, in various embodiments, an ad-hoc or otherwise decentralized type of wireless network that does not rely on a preexisting infrastructure (e.g., a router or access point), but rather, where each node (e.g., content consumption device) within the network is capable of participating in routing of data by forwarding data from one or more nodes in the network to one or more other nodes in the network.

For example, illustrative content information networks 108(1) and 108(N) may each include a plurality of respective consumption devices 114 and 116. The consumption devices 114, 116 may include any suitable device operable by an end user to consume (e.g., watch, listen, read, etc.) content including, but not limited to, a desktop computer, a laptop computer, a smartphone device, a tablet device, an electronic reader, a gaming console, a set-top box, a digital video recorder (DVR), other customer premises equipment, a digital music player, a television, a smart television, or any other suitable device with network capabilities. Each consumption device 114, 116 may be configured to communicate with each other consumption device within a same content information network via one or more communication technologies (e.g., WiFi, BLUETOOTH®, NFC, etc.). In certain embodiments, any particular consumption device 114, 116 may be able to exchange information with any other device within the same content information network notwithstanding a potential lack of direct connectivity between the devices. For example, information may be exchanged between any two consumption devices 114, 116 within a same content information network via one or more intermediary consumption devices within the network, and the information exchange may potentially involve communication between devices in accordance with multiple different communication technologies or standards.

In various embodiments, one or more consumption devices 114, 116 within each content information network 108(1)-108(N) may be a content consumption hub device that is configured to communicate with one or more content information hubs 102 (which may be referred to herein generically as content information hub 102). As illustratively depicted in FIG. 1, one or more of the content information network(s) 108(1)-108(N) may include multiple consumption devices each of which is capable of serving as a consumption hub device for the content information network by virtue of direct connectivity to the content information hub 102.

In those embodiments in which multiple consumption devices within a content information network may each be able to serve as a consumption hub device for the network, one or more prioritization criteria may be used to determine which device acts as the consumption hub device. The prioritization criteria may include any suitable criteria including, but not limited to, a signal strength or other metric indicative of the quality of the connection to the content information hub, a predefined ordering that specifies an order in which devices are designated to serve as the consumption hub, and so forth. In certain embodiments, a particular consumption device within a content information network may be designated to serve as a primary consumption hub and one or more other consumption devices within the content information network may be designated to serve as standby or back-up consumption hubs in the event that the primary consumption hub device becomes incapable of serving as the consumption hub device.

For example, the illustrative content information network 108(1) depicted in FIG. 1 includes a consumption device that serves as a primary consumption hub device 110(A) and a consumption device that serves as a standby consumption hub device 110(B). Similarly, the illustrative content information network 108(N) depicted in FIG. 1 includes a consumption device that serves as a primary consumption hub device 112(A) and a consumption device that serves as a standby consumption hub device 112(B). Each of the primary consumption hub devices 110(A), 112(A) and the standby consumption hub devices 110(B), 112(B) are depicted as having direct connectivity to the content information hub 102. It should be noted that the phrase "direct connectivity" as used herein (at least in the context of the connectivity between the consumption hub devices and the content information hub 102) may refer to connectivity that does not involve or require another consumption device as an intermediary device. The term, however, does not preclude the presence of one or more other intermediary devices (e.g., routers, switches, etc.) that may facilitate exchange of information between the consumption hub devices and the content information hub 102.

As previously described, each consumption device (e.g., 114, 116) within a content information network (e.g., 108(1)-108(N)) may be capable of reporting consumption event information to a consumption hub device (e.g., 110(A), 112(A)) within a same content information network. Further, the consumption hub device (e.g., 110(A), 112(A)) may itself be a consumption device capable of gathering consumption event information indicative of consumption events involving content consumed or to be consumed on the consumption hub device. The consumption hub device (e.g., 110(A), 112(B)) may be configured to communicate consumption event information received from a consumption device within its content information network (including consumption event information pertaining to consumption events occurring with respect to the consumption hub device itself) to other consumption devices within the content information network. The consumption hub device may be further configured to request, from the information hub device 102, content-related information (e.g., content metadata, related content, etc.) relating to content identified in received consumption event information and communicate the content-related information to various consumption devices within its content information network. The content metadata may include any information relating to the content such as, for example, ratings of the content, reviews of the content, additional information regarding one or more attributes of the content, and so forth.

In certain embodiments, the content information network(s) 108(1)-108(N) may collectively represent part of a larger partial virtual mesh network whereby a consumption hub device (e.g., 110(A)) forming part of one content information network (e.g., 108(1)) may receive consumption event information associated with consumption events occurring on consumption devices forming part of another content information network (e.g., 108(N)). The consumption hub device (e.g., 110(A)) of a particular content information network (e.g., 108(1)) may request and receive, from the content information hub 102, consumption event information pertaining to content consumed or to be consumed on consumption devices (e.g., 116) forming part of other content information networks (e.g., 108(N)) and/or content-related information relating to the content identified in the consumption event information, and may propagate the information to other consumption devices (e.g., 114) within its content information network. In this manner, content-related information may be exchanged between content information networks 108(1)-108(N) via the content information hub 102.

The type and/or extent of consumption event information communicated by a consumption device to a corresponding consumption hub device may be determined based on user settings associated with an end user of the content consumption device. For example, in certain embodiments, an end user may elect to restrict the sharing of consumption event information to only certain types of content. As a non-limiting example, user setting(s) may prohibit the communication of consumption event information pertaining to content that is associated with an adult rating, content that includes confidential or private information, and so forth. As another non-limiting example, user setting(s) may designate that consumption event information pertaining to certain content or certain types of content should be communicated to only certain designated users.

In one or more embodiments of the disclosure, device setting(s) associated with a consumption device may affect what information is presented to the user via the consumption device and/or the manner in which the information is presented. For example, Application Programming Interfaces (APIs) available on a consumption device, processing capabilities of the device, graphics capabilities of the device, and so forth may impose limits on the types of information capable of being presented by the device to the end user and/or the manner in which the information is presented. Further, in certain embodiments, user setting(s) associated with an end user of a consumption device may also affect the type of information presented to the end user and/or the manner of presentation. As a non-limiting example, a parental user may be able to control the user setting(s) associated with a child user so as to permit only certain types of content-related information to be presented to the child user. Such user setting(s) may, for example, operate in concert with setting(s) the type of content available to the child user on the consumption device.

As previously described, content-related information relating to content identified in consumption event information may be received by a consumption device and presented to an end user of the device via one or more user interfaces rendered on the device. The content to which the information relates may be associated with consumption events occurring on the consumption device or consumption events occurring on one or more other consumption devices. The received information may be presented in any suitable way in accordance with user setting(s) associated with an end user of the device and/or device setting(s) associated with the device. For example, the received information may be presented in conjunction with content currently being consumed on the device as an overlay presentation, as a split-display presentation, or in any other suitable manner.

In certain embodiments, an end user consuming content on a consumption device may be presented with content-related information relating to the content being consumed. The information relating to the consumed content may be presented on the same consumption device on which the content is being consumed or on a different consumption device associated with the user. As a non-limiting example, an end user watching a movie on a consumption device may be presented with metadata relating to the movie such as, for example, background information relating to various cast members, various facts or trivia information associated with the movie, and so forth.

As another non-limiting example, an end user consuming content on a consumption device may be presented with an indication that one or more other users of other consumption devices within the same content information network and/or one or more other content information networks are consuming the same or similar content.

As yet another non-limiting example, a shared content consumption experience may be provided to multiple users on consumption devices forming part of the same content information network or multiple distinct content information networks. For example, an end user consuming content on a consumption device may be presented with interactive content allowing the user to communicate in real-time with one or more other users consuming the same or similar content. As another non-limiting example of a shared content consumption experience, multiple users may independently interact with at least a portion of shared content presented on respective consumption devices as part of, for example, a multi-user game (e.g., poker, multi-player video games, multi-player mobile application games, etc.).

It should be appreciated that the above examples of user setting(s), device setting(s), information that may be presented to a user of any particular consumption device and which relates to consumption events associated with that particular consumption device or one or more other consumption devices, and/or the manner in which such information may be presented to the user are merely illustrative and not exhaustive. It should be appreciated that numerous other examples are within the scope of this disclosure.

Still referring to the illustrative system architecture 100 depicted in FIG. 1, each consumption hub device (e.g., 110(A), 110(B), 112(A), 112(B)) may be communicatively coupled to the content information hub 102 via one or more networks 104. The network(s) 104 may include any one or a combination of different types of suitable communications networks such as, for example, cable networks, public networks (e.g., the Internet), private networks, wireless networks, cellular networks, or any other suitable private and/or public networks. Further, the network(s) 104 may have any suitable communication range associated therewith and may include, for example, global networks (e.g., the Internet), metropolitan area networks (MANs), wide area networks (WANs), local area networks (LANs), or personal area networks (PANs). In addition, the network(s) 104 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The content information hub 102 may, in turn, be communicatively coupled to one or more content information source servers 124(1)-124(R) via one or more networks 122. The network(s) 122 may include any one or more of the types of networks discussed earlier through reference to the network(s) 104, may have any suitable communication ranges associated therewith, and may carry network traffic over any suitable medium including any of those discussed earlier through reference to the network(s) 104. In accordance with one or more embodiments of the disclosure, in response to a request for content-related information received from a consumption hub device (e.g., 110(A)), the content information hub 102 may query one or more of the content information source server(s) 124(1)-124(R), receive the requested information therefrom, and communicate the information to the requesting consumption hub device. In certain embodiments, the requested information may be communicated to one or more other consumption hub devices associated with different content information networks. The information may be communicated to these other consumption hub devices via a "pull" or "push" mechanism.

Upon receipt of information from the content information hub 102, a consumption hub device (e.g., 110(A)) may communicate the information to one or more other consumption devices (e.g., 114) within the same content information network (e.g., 108(1)). In certain embodiments, by virtue of the mesh network configuration of the content information network, the consumption hub device may communicate the information to a subset of consumption devices within the content information network which may, in turn, propagate the information to other devices within the content information network.

The information requested by a consumption hub device (e.g., 110(A)) from the content information hub 102 may include consumption event information associated with consumption events occurring on one or more consumption devices (e.g., 116) associated with one or more different content information networks (e.g., 108(N)). Alternatively, or additionally, the information requested by a consumption hub device may include content-related information (e.g., metadata, related content, etc.) relating to content consumed on consumption devices forming part of a same content information network as the consumption hub device. Alternatively, or additionally, the information requested by a consumption hub device may include content-related information relating to content identified in consumption event information associated with consumption events that occurred on consumption devices forming part of a different content information network. It should be appreciated that the above examples of the types of information that may be requested by a consumption hub device from the content information hub 102 are merely illustrative and not exhaustive and that numerous other examples are within the scope of this disclosure.

Still referring to FIG. 1, one or more content source servers 120 may be provided. The content source server(s) 120 may include any suitable processor-driven device and may store content that may be accessed or received by consumption devices (e.g., 114, 116) of the content information network(s) 108(1)-108(N). Consumption devices (e.g., 114, 116) of various content information network(s) 108(1)-108(N) may access, retrieve or receive content from the one or more of the content source server(s) 120 via one or more networks 118. While the content source server(s) 120 are depicted as distinct from the network(s) 118, it should be appreciated that, in certain embodiments, one or more of the content source server(s) 120 may form part of the network(s) 118. Further, while the content source server(s) 120 are depicted in the aggregate, it should be appreciated that the content source server(s) 120 may be hosted by any number of different entities.

The network(s) 118 may include any suitable network via which content may be delivered to consumption devices. For example, the network(s) 118 may include a content delivery or distribution network (CDN) that may include a distributed system of servers (which may include one or more of the content source server(s) 120) that store and serve content such as web objects, downloadable objects, applications, live streaming media, on-demand streaming media, social networks, and so forth. As another non-limiting example, the network(s) 118 may include a switched digital video (SDV) network over which digital video content is transmitted to the consumption devices using any suitable data transmission medium (e.g., optical fiber, coaxial cable, a combination thereof, etc.). As yet another non-limiting example, the network(s) 118 may include any one or more terrestrial, satellite, and/or cable networks. As still another non-limiting example, the network(s) 118 may include any one or more public or private networks (e.g., the Internet) and the content source server(s) 120 may include one or more web servers configured to store and serve content to the consumption devices. As a further non-limiting example, the network(s) 118 may include a packet-switched network (e.g., the Internet) capable of transmitting content (e.g., live television, time-shifted television, video on demand (VOD), etc.) in accordance with the Internet protocol suite. It should be appreciate that the above examples are merely illustrative and that the network(s) 118 may include any suitable network(s) for delivering any of a variety of types or forms of content to the consumption devices of content information networks.

As depicted in FIG. 1, the illustrative system architecture 100 may further include a content consumption platform 106 that may receive consumption event information indicative of consumption events occurring on consumption devices 126 not forming part of a content information network and may communicate the received consumption event information to consumption hub devices (e.g., 110(A), 112(A)) of various content information networks (e.g., 108(1)-108(N)) via, for example, one or more of the network(s) 104. The content consumption platform 106 may include any number of processor-driven devices, networking devices, and so forth.

In certain embodiments, the content consumption platform 106 may gather or otherwise receive consumption event information from various content service portals (e.g., a CDN, an SDV network, one or more web servers, etc.). For example, although not depicted in FIG. 1, the content consumption platform 106 may be communicatively coupled to the content source server(s) 120 via one or more of the network(s) 118 and may receive consumption event information therefrom. Further, although not depicted in FIG. 1, the content consumption devices 126 may be able to access, retrieve, or otherwise receive content from the content source server(s) 120 via one or more of the network(s) 118.

The content consumption platform 106 may gather or otherwise receive consumption event information pertaining to consumption events associated with the content consumption device(s) 126 in accordance with any suitable mechanism. For example, consumption event information may be included in an Enhanced Binary Interchange Format (EBIF) resource file that is communicated by an EBIF agent associated with a content consumption device 126 to the content consumption platform 106. It should be appreciated that the above example is merely illustrative and that numerous other mechanisms may be utilized for communicating consumption event information associated with consumption events on the consumption devices 126 to the content consumption platform 106.

Upon receipt of consumption event information, the content consumption platform 106 may make the information available to a consumption hub device associated with a content information network based, for example, on publish-subscribe functionality. More specifically, a consumption hub device may transmit a subscription request to the content consumption platform 106 to receive notifications from the content consumption platform 106 associated with consumption events occurring on content consumption devices 126 identified in the subscription request. Upon acceptance of the subscription request, the content consumption platform 106 may transmit ("publish"), to the consumption hub device, consumption event information pertaining to consumption events associated with content consumption devices 126 to which the subscription relates. Upon receipt of consumption event information from the content consumption platform 106, a consumption hub device may then distribute the consumption event information to other consumption devices within the content information network.

In certain embodiments, a consumption device that receives the consumption event information transmitted to a consumption hub device from the content consumption platform 106, may communicate a request to the consumption hub device for content-related information relating to content identified in the consumption event information. In response to receipt of the request, the consumption hub device may request the content-related information from the content information hub 102, and upon receipt, communicate the information to one or more consumption devices within the network. Further, in various embodiments, the consumption hub device may independently request, from the content information hub 102, content-related information relating to content identified in the consumption event information received from the content consumption platform 106, and upon receipt, may communicate the content-related information to consumption device(s) within the content information network.

Further, in various other embodiments, the content consumption platform 106 may communicate consumption event information relating to consumption events associated with the consumption devices 126 to the content information hub 102 and/or the content information source server(s) 124(1)-124(R) for use in servicing requests for content-related information from one or more consumption hub devices. In addition, in various embodiments, the content consumption platform 106 may communicate consumption event information received from a consumption hub device or another consumption device forming part of a content information network to one or more of the consumption devices 126 in accordance with any of the methodologies described herein.

It should be appreciated that the system architecture 100 depicted in FIG. 1 is merely illustrative and that fewer, additional, and/or different components of the architecture 100 that those depicted may be provided in one or more embodiments of the disclosure. Further, any illustrative functionality described as being supported by a particular component or set of components may, in various embodiments, be supported at least in part by one or more other components.

Figure 2:
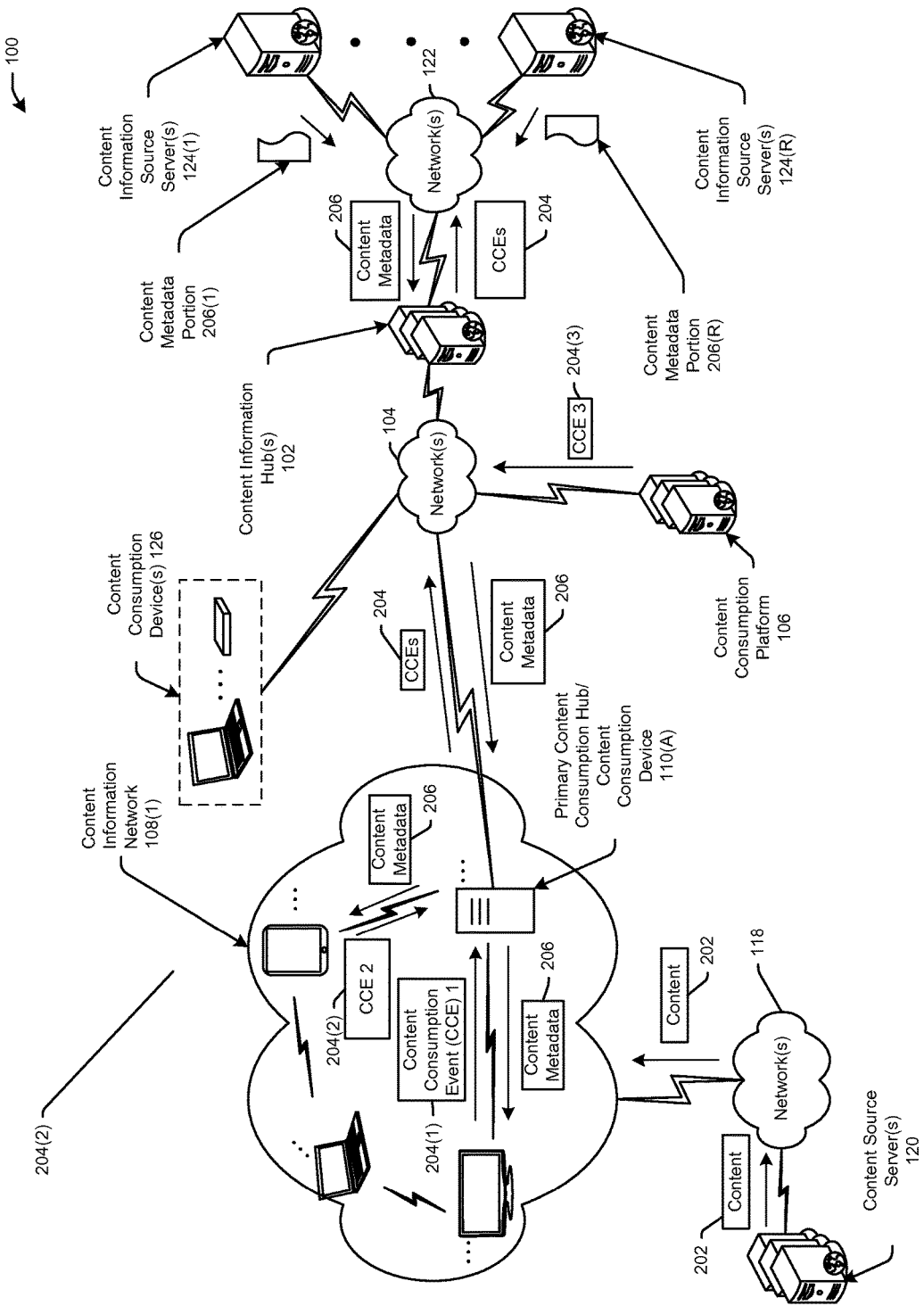
FIG. 2 is a schematic block diagram depicting illustrative data flows between components of the illustrative system architecture of FIG. 1 in accordance with one or more embodiments of the disclosure.

FIG. 2 is a schematic block diagram depicting illustrative data flows between components of the illustrative system architecture 100 of FIG. 1 in accordance with one or more embodiments of the disclosure.

The content information network 108(1) is depicted as an illustrative content information network in FIG. 2. One or more consumption devices 114 forming part of the content information network 108(1) may access, retrieve, or otherwise receive content 202 from one or more of the content source server(s) 120 via one or more of the network(s) 118.

One or more consumption events associated with the content 202 may occur on one or more of the consumption devices 114 in the content information network 108(1). The consumption event(s) may include any of consumption event types or classifications previously described. Consumption event information identifying one or more characteristics of a respective corresponding consumption event may be communicated from the consumption device with which the consumption event is associated to the consumption hub device 110(A) of the content information network 108(1).

For example, a first consumption device in the content information network 108(1) may communicate consumption event information 204(1) pertaining to a consumption event associated with the first consumption device. As described earlier and as will be described in more detail through reference, for example, to FIG. 3, a respective instance of a content information sharing application executing on the first consumption device may detect the consumption event and gather/generate the consumption event information 204

(1) for communication to the consumption hub device 110(A). Similarly, a second consumption device in the content information network 108(1) may communicate consumption event information 204(2) pertaining to a consumption event associated with the second consumption device.

The consumption hub device 110(A) (or more specifically a respective instance of the content information sharing application executing on the consumption hub device 110(A) may coordinate receipt of consumption event information (e.g., 204(1), 204(2)) from any of the other consumption devices within the content information network 108(1). The consumption hub device 110(A) may then communicate at least a portion of the consumption event information (or an indication of the content identified therein) along with a request for content-related information relating to content identified in the consumption event information to the content information hub 102 via one or more of the network(s) 104. The request for the content-related information may be communicated by the consumption hub device 110(A) to the content information hub 102 responsive to a request received from a consumption device and/or independently of a received request from a consumption device. In certain embodiments, while not shown among the illustrative data flows depicted in FIG. 2, the consumption hub device 110(A) may communicate consumption event information received from a consumption device (or gathered based on consumption event(s) occurring on the consumption hub device 110(A) itself) to one or more other consumption devices within the content information network 108(1). Upon receipt by a consumption device of consumption event information pertaining to content consumed on another consumption, the consumption device may communicate request to the consumption hub device for content-related information relating to content identified in the consumption event information. The consumption hub device may then, in turn, communicate a request for the content-related information to the content information hub 102.

As previously described, the content consumption platform 106 may communicate, to consumption hub device(s) (e.g., 110(A)) via a publish-subscribe mechanism for example, consumption event information pertaining to consumption events occurring on consumption devices 126 that do not form part of a content information network. Such consumption devices 126 may not be capable of independently communicating such information to a consumption hub device. The content consumption platform 106 may receive consumption event information identifying consumption events associated with the consumption devices 126 from one or more content service portals and may communicate the consumption event information to those consumption hub devices that are indicated a desire to receive such information. In certain embodiments, a consumption hub device may indicate a desire (e.g., subscribe) to receive consumption event information pertaining to consumption events on certain of the consumption devices 126. While not explicitly depicted in FIG. 2, consumption event information 204(3) may be communicated from the content consumption platform 106 to the consumption hub device 110(A) for example. The consumption hub device 110(A) may communicate at least a portion of the consumption event information (or an indication of content identified therein) to the content information hub 102 along with a request for content-related information (e.g., content metadata) relating to content identified in the consumption event information. The request for content-related information may, in certain embodiments, include various parameters specifying the type, format, etc. of the content-related information that is requested. As a non-limiting example, an illustrative request for content-related information may specify that only video content associated with content identified in consumption event information is requested.

As depicted in FIG. 2, upon receipt, by the content information hub 102 form the consumption hub device 110(A), of request(s) for content-related information relating to one or more content identified in consumption event information pertaining to one or more consumption events associated with one or more consumption devices, the content information hub 102 may retrieve or request the content-related information from one or more content information source server(s) 124(1)-124(R). For example, the content information hub 102 may retrieve identifying information associated with content (e.g., a content identifier) from a request received from the consumption hub device 110(A) and communicate the identifying information to one or more of the content information source server(s) 124(1)-124(R). The content source server(s) 124(1)-124(R) may optionally store the requested content-related information or may access the information from one or more other data sources.

At least a portion of the content-related information 206(1)-206(R) may be received from each of one or more of the content source server(s) 124(1)-124(R) by the content information hub 102 via one or more of the network(s) 122. Upon receipt, the content information hub 102 may optionally aggregate the received portions of the content-related information to generate aggregated content-related information 206 and communicate the information 206 to the requesting consumption hub device 110(A). Upon receipt of the information, the consumption hub device 110(A) may communicate the content-related information 206 to one or more of the consumption devices within the content information network 108(1) for potential distribution to all consumption devices within the network. A respective instance of the content information sharing application executing on each of the consumption devices in the network may then present at least a portion of the content-related information 206 to a user of the consumption device based on user setting(s) and/or device setting(s).

It should be appreciated that the data flows shown in FIG. 2 are merely illustrative and that numerous other data flows associated with numerous other possible operating states of the system architecture 100 are within the scope of this disclosure.

Figure 3:
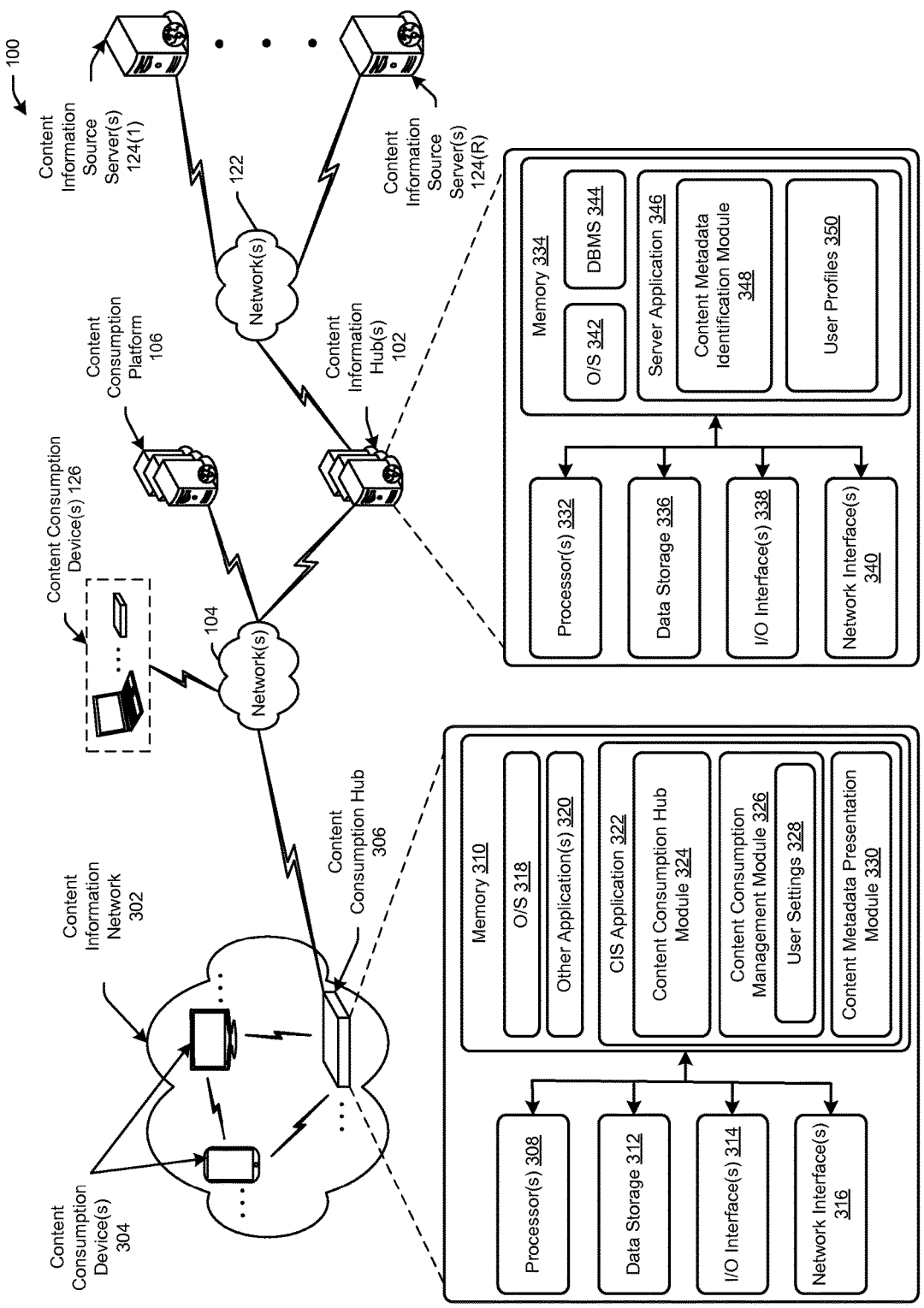
FIG. 3 is a more detailed schematic block diagram depicting various illustrative hardware and software sub-components of components of the illustrative system architecture of FIG. 1 in accordance with one or more embodiments of the disclosure.

FIG. 3 is a more detailed schematic block diagram depicting various illustrative hardware and software sub-components of components of the illustrative system architecture 100 of FIG. 1 in accordance with one or more embodiments of the disclosure.

An illustrative content information network 302 is depicted in FIG. 3 and may correspond to any of the content information networks 108(1)-108(N) depicted and described through reference to FIGS. 1-2. Various consumption devices 304 may form at least part of the content information network 302 and may correspond to any of the consumption devices (e.g., 114, 116) previously described or depicted in FIGS. 1-2. In addition, one or more of the consumption devices 304 may be able to serve as consumption hub device for coordinating receipt of consumption event information from other consumption devices within the network 302 as well as for communicating content-related information received from the content information hub 102 to the consumption devices 304. For ease explanation, a single consumption hub device 306 is depicted in FIG. 3.

FIG. 3 additionally depicts some of the illustrative components of the architecture 100. For example, the network(s) 104, the content information hub 102, the content consumption platform 106, the consumption devices 126, the network(s) 122, and the content information source server(s) 124(1)-12(R) are illustratively depicted. Various illustrative software, firmware, and/or hardware components of the consumption hub device 306 and the content information hub 102 are depicted in FIG. 3. While not shown, it should be appreciated that any of the other illustrative components of the architecture 100 may include any of the illustrative software, firmware, and/or hardware components of the consumption hub device 306 and/or the content information hub 102 and/or additional or different components.

The consumption hub device 306 may include one or more memories 310 (generically referred to herein as memory 310) and one or more processors (processor(s)) 308 configured to execute computer-executable instructions that may be stored in the memory 310. As previously noted, the consumption hub device 306 may itself by a consumption device enabling the consumption of a variety of types of content by a user and may include, but is not limited to, a desktop computer, a laptop computer, a smartphone device, a tablet device, an electronic reader, a gaming console, a set-top box, a digital video recorder (DVR), other customer premises equipment, a digital music player, a television, a smart television, or any other suitable device with network capabilities.

The processor(s) 308 may include any suitable processing unit capable of accepting digital data as input, processing the input data in accordance with stored computer-executable instructions, and generating output data. The processor(s) 308 may be configured to execute the computer-executable instructions to cause or facilitate the performance of various operations. The processor(s) 308 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 310 may store computer-executable instructions that are loadable and executable by the processor(s) 308 as well as data manipulated and/or generated by the processor(s) 308 during the execution of the computer-executable instructions. The memory 310 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 310 may include multiple different types of memory, such as various forms of static random access memory (SRAM), various forms of dynamic random access memory (DRAM), various forms of unalterable ROM, and/or writeable variants of ROM such as electrically erasable programmable read-only memory (EEPROM), flash memory, and so forth.

The consumption hub device 306 may further include additional data storage 312 such as removable storage and/or non-removable storage including, but not limited to, magnetic storage, optical disk storage, and/or tape storage. Data storage 312 may provide storage of computer-executable instructions and other data. The data storage 312 may include storage that is internal and/or external to the consumption hub device 306. The memory 310 and/or the data storage 312, removable and/or non-removable, are examples of computer-readable storage media (CRSM).

The memory 310 may store data, computer-executable instructions, applications, and/or various program modules including, for example, one or more operating systems 318 and various applications including, for example, a content information sharing (CIS) application 322 and other application(s) 320 that may be executable on the consumption hub device 306.

The operating system (O/S) 318 may provide an interface between applications and/or program modules executable on the consumption hub device 306 (e.g., other application(s) 320, CIS application 322, etc.) and hardware resources of the consumption hub device 306. More specifically, the O/S 318 may include a set of computer-executable instructions for managing hardware resources of the consumption hub device 306 and for providing common services to applications and/or program modules executable on the consumption hub device 306 (e.g., managing memory allocation among various applications and/or program modules). The O/S 318 may include any operating system now known or which may be developed in the future including, but not limited to, any desktop or laptop operating system, any mobile operating system, or any other proprietary or freely available operating system.

Although not depicted in FIG. 3, the memory 310 may further include one or more database management systems (DBMS) for accessing, retrieving, storing, and/or manipulating data stored in one or more datastores that may be provided externally to the consumption hub device 306 or one or more internal datastores provided, for example, as part of the data storage 312. The internal and/or external datastore(s) may store data, program modules, and so forth (at least a subset of which may be managed by the DBMS). The DBMS may use any of a variety of database models (e.g., relational model, object model, etc.) and may support any of a variety of query languages.

The CIS application 322 may include one or more program modules including computer-executable instructions that in response to execution by one or more of the processor(s) 308 cause various operations to be performed. For example, a content consumption hub module 324, a content consumption management module 326, and a content metadata presentation module 330 (which hereinafter may be referred to as a content-related information presentation module) are illustratively depicted.

In one or more embodiments of the disclosure, a respective instance of the CIS application may be executable on each of the consumption devices 304 in the content information network 302 including the consumption hub device 306. However, in certain embodiments, certain program modules may be executed in connection with functionality supported by certain devices. For example, computer-executable instructions provided as part of the content consumption hub module 324 may be executed on the consumption hub device 306 to coordinate the receipt of consumption event information from other consumption devices in the content information network, communicate requests to the content information hub 102 for content-related information and/or consumption event information associated with other consumption devices (e.g., consumption devices forming part of a different content information network, consumption devices 126, etc.), and facilitate distribution of content-related information and/or consumption event information to the consumption devices within its content information network.

Computer-executable instructions provided as part of the content consumption management module 326 may, in various embodiments, by executed in connection with a respective instance of the CIS application 322 that is executing on each of the consumption devices 304 in the content information network 302. The content consumption management module 326 may support functionality for detecting consumption events occurring on a consumption device, gathering/generating consumption event information pertaining to the consumption events, and communicating the consumption event information to the content consumption hub module 324 executing on the consumption hub device 306. As previously described, the consumption management module 326 may utilize one or more user settings 328 associated with a user profile to determine the nature and extent of the consumption event information that may be shared with the consumption hub device 306, and thus, with other consumption devices within the content information network. For example, user setting(s) 328 associated with a user may restrict consumption event information from being shared for certain types of content consumed by the user. In certain embodiments, one or more of the user setting(s) 328 associated with a user may be device specific. For example, a user may elect to share consumption event information associated with a wider range of content on one consumption device versus another.

The CIS application 322 is further illustratively depicted as including a content-related information presentation module 330 that may include computer-executable instructions that when executed by one or more of the processor(s) 308 causes various operations associated with the presentation of content-related information to be performed. Computer-executable instructions provided as part of the content-related information presentation module 330 may, in various embodiments, by executed in connection with a respective instance of the CIS application 322 that is executing on each of the consumption devices 304 in the content information network 302. For example, computer-executable instructions provided as part of the content-related information presentation module 330 may be executed to present at least a portion of content-related information received by a consumption device from the consumption hub device 306 to a user of the consumption device. Although not depicted in FIG. 3, it should be appreciated that user setting(s) and/or device setting(s) may control the type and extent of the content-related information that is presented to a particular user of a particular consumption device as well as, potentially, the manner of presentation.

It should be appreciated that the various applications, program modules, and so forth depicted as forming part of the consumption hub device (and one or more of the consumption devices) are merely illustrative and that fewer, additional, and/or different applications, program modules, and so forth may be provided as well.

The consumption hub device 306 may further include one or more I/O interfaces 314 that facilitate receipt, by the consumption hub device 306, of information input via one or more I/O devices associated with the device 306 as well as the outputting of information from the device 306 to the one or more I/O devices. The I/O devices may include, but are not limited to, a display, a keypad, a keyboard, a pointing device, a control panel, a touch screen display, a remote control device, a speaker, a microphone, and so forth. It should be appreciated that any of the consumption devices 304 may include similar I/O interfaces for interacting with similar types of I/O devices.

The consumption hub device 306 may further include one or more network interfaces 316 that may facilitate communication between the consumption hub device 306 and other components of the system architecture 100 such as, for example, other consumption devices 304, the content information hub 102, the content consumption platform 106, and so forth. It should be appreciated that any of the consumption devices 304 may include similar network interfaces for facilitating various forms of network interaction.

Various illustrative software, firmware, and/or hardware components are also depicted as forming part of the content information hub 102. The content information hub 102 may include one or more memories 334 (generically referred to herein as memory 334) and one or more processors (processor(s)) 332 configured to execute computer-executable instructions that may be stored in the memory 334. The content information hub 102 may include any suitable processor-driven device with network capabilities.

The processor(s) 332 may include any suitable processing unit capable of accepting digital data as input, processing the input data in accordance with stored computer-executable instructions, and generating output data. The processor(s) 332 may be configured to execute the computer-executable instructions to cause or facilitate the performance of various operations. The processor(s) 332 may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory 334 may store computer-executable instructions that are loadable and executable by the processor(s) 332 as well as data manipulated and/or generated by the processor(s) 332 during the execution of the computer-executable instructions. The memory 334 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 334 may include multiple different types of memory, such as various forms of static random access memory (SRAM), various forms of dynamic random access memory (DRAM), various forms of unalterable ROM, and/or writeable variants of ROM such as electrically erasable programmable read-only memory (EEPROM), flash memory, and so forth.

The content information hub 102 may further include additional data storage 336 such as removable storage and/or non-removable storage including, but not limited to, magnetic storage, optical disk storage, and/or tape storage. Data storage 336 may provide storage of computer-executable instructions and other data. The data storage 336 may include storage that is internal and/or external to the content information hub 102. The memory 334 and/or the data storage 336, removable and/or non-removable, are examples of computer-readable storage media (CRSM).

The memory 334 may store data, computer-executable instructions, applications, and/or various program modules including, for example, one or more operating systems 342, one or more database management systems (DBMS 344), and various applications including, for example, a server application 346 that may include various program modules described in more detail hereinafter.

The operating system (O/S) 342 may provide an interface between applications and/or program modules executable on the content information hub 102 (e.g., the server application 346, other application(s), etc.) and hardware resources of the content information hub 102. More specifically, the O/S 342 may include a set of computer-executable instructions for managing hardware resources of the content information hub 102 and for providing common services to applications and/or program modules executable on the content information hub 102 (e.g., managing memory allocation among various applications and/or program modules). The O/S 342 may include any operating system now known or which may be developed in the future including, but not limited to, any desktop or laptop operating system, any mobile operating system, any server operating system, any mainframe operating system, or any other proprietary or freely available operating system.

The memory 334 may further include DBMS 344 for accessing, retrieving, storing, and/or manipulating data stored in one or more datastores that may be provided externally to the content information hub 102 or one or more internal datastores provided, for example, as part of the data storage 336. The internal and/or external datastore(s) may store data, program modules, and so forth (at least a subset of which may be managed by the DBMS 344). The DBMS 344 may use any of a variety of database models (e.g., relational model, object model, etc.) and may support any of a variety of query languages.

The server application 346 may include one or more program modules including computer-executable instructions that in response to execution by one or more of the processor(s) 332 cause various operations to be performed. For example, the server application 346 may include a content metadata identification module 348 (hereinafter referred to as a content-related information identification module) that may include computer-executable instructions for receiving requests from consumption hub devices of various content information networks (e.g., consumption hub 306 of the content information network 302), identifying content specified in the requests, and retrieving or requesting content-related information relating to the identified content from one or more of the content source server(s) 124(1)-124(R). Further, in certain embodiments, the content consumption platform 106 may communicate consumption event information pertaining to consumption events associated with one or more of the consumption devices 126 to the content information hub 102 and/or one or more of the content information source server(s) 124(1)-124(R). Such consumption event information may be used to service requests received from consumption hub devices (which may in turn be tied to requests received from various consumption devices within content information networks managed by the consumption hub devices) for content-related information relating to content associated with consumption events to which the consumption event information relates.

The server application 346 may utilize various user profiles 350 that may specify various user preferences or other parameters associated with content-related information requested by consumption hub devices. For example, a request received from a consumption hub device for content-related information (e.g., content metadata, related content, etc.) relating to content may further include an identification of one or more users with whom the request is associated. The server application 346 may utilize the user profiles 350 to determine a type, format, and so forth of content-related information to request from one or more of the content source server(s) 124(1)-124(R) in response to the request received from the consumption hub device.

It should be appreciated that the various applications, program modules, and so forth depicted as forming part of the content information hub 102 are merely illustrative and that fewer, additional, and/or different applications, program modules, and so forth may be provided as well.

The content information hub 102 may further include one or more I/O interfaces 338 that facilitate receipt, by the content information hub 102, of information input via one or more I/O devices associated with the content information hub 102 as well as the outputting of information from the content information hub 102 to the one or more I/O devices. The I/O devices may include, but are not limited to, a display, a keypad, a keyboard, a pointing device, a control panel, a touch screen display, a remote control device, a speaker, a microphone, and so forth.

The content information hub 102 may further include one or more network interfaces 340 that may facilitate communication between the content information hub 102 and other components of the system architecture 100 such as, for example, various consumption hub devices (e.g. consumption hub device 306), the content consumption platform 106, the content source server(s) 124(1)-124(R), and so forth.

Those of ordinary skill in the art will appreciate that any of the components of the architecture 100 may include alternate and/or additional hardware, software or firmware components beyond those described or depicted without departing from the scope of the disclosure. More particularly, it should be appreciated that software, firmware or hardware components depicted as forming part of any of the components of the architecture 100 are merely illustrative and that some components may not be present or additional components may be provided in various embodiments. While various program modules have been depicted and described with respect to various illustrative components of the architecture 100, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Figure 4:
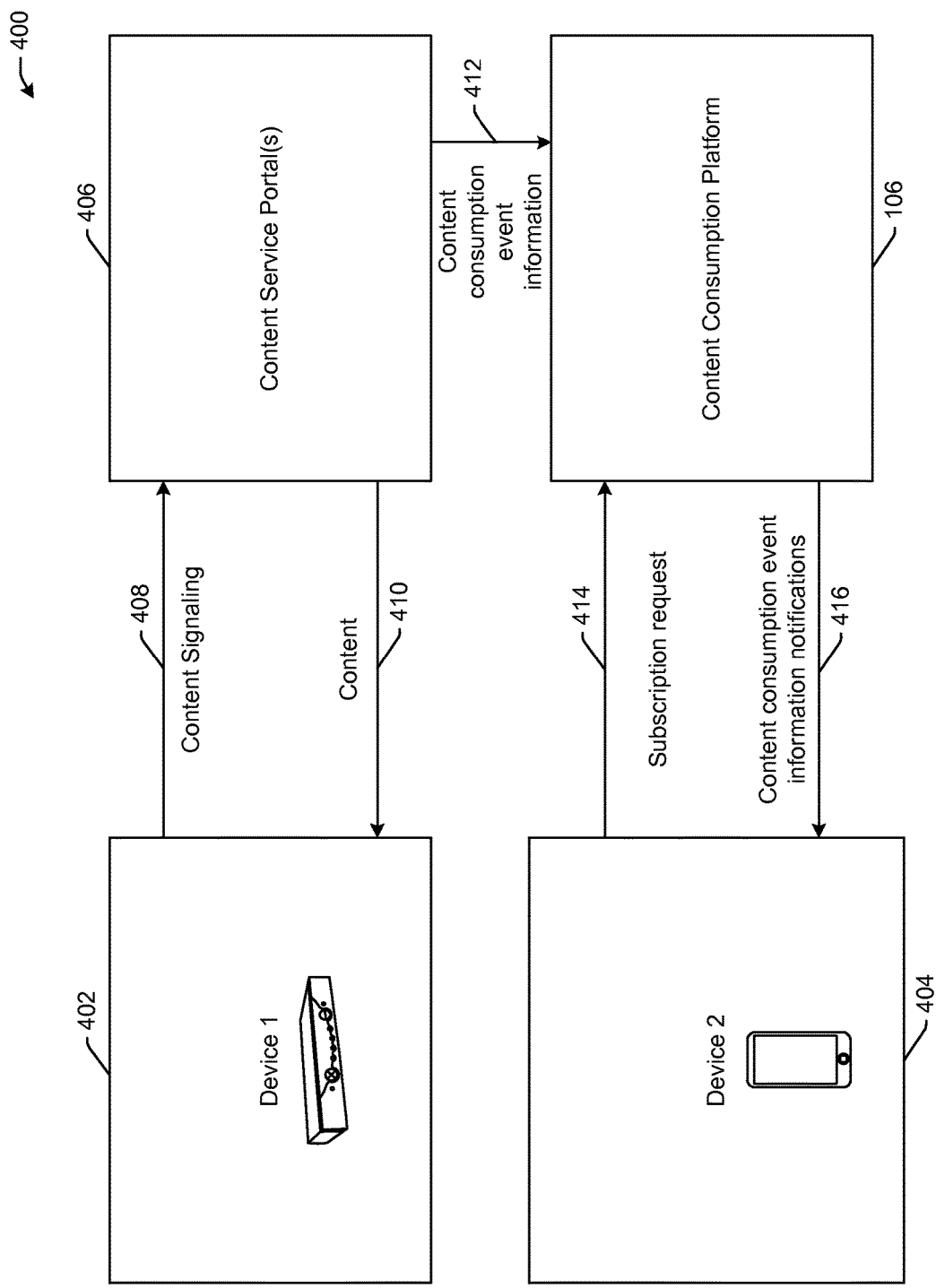
FIG. 4 is a schematic block diagram depicting illustrative data flows associated with functionality supported by a content consumption platform in accordance with one or more embodiments of the disclosure.

FIG. 4 is a schematic block diagram depicting illustrative data flows associated with functionality supported by a content consumption platform in accordance with one or more embodiments of the disclosure.

A first consumption device 402 and a second consumption device 404 are illustratively depicted in FIG. 4. The first consumption device 402 may correspond to one of the consumption devices 126 that may not be part of a content information network, and thus, may not be able to communicate consumption event information to an associated consumption hub device. The second consumption device 404 may be, for example, a consumption hub device forming part of a content information network or another consumption device within the network.

The first consumption device 402 may communicate a request for content to one or more content service portals 406. The content service portal(s) 406 may include any of those previously described including, but not limited to, a CDN, an SDV, one or more web servers, and so forth. The content service portal(s) 406 may transmit content 410 to the first consumption device 402 in response to the received request.

The content consumption platform 106 may be communicatively coupled to the content service portal(s) 406 and may be configured to gather or otherwise receive consumption event information from the content service portal(s) 406. The content consumption platform 106 may gather or otherwise receive consumption event information pertaining to consumption events associated with the content consumption device(s) 126 in accordance with any suitable mechanism. For example, consumption event information may be included in an Enhanced Binary Interchange Format (EBIF) resource file that is communicated by an EBIF agent associated with a content consumption device 126 to the content consumption platform 106 via the content service portal(s) 406. It should be appreciated that the above example is merely illustrative and that numerous other mechanisms may be utilized for communicating consumption event information associated with consumption events on the consumption devices 126 to the content consumption platform 106.

Upon receipt of consumption event information, the content consumption platform 106 may make the information available to the second consumption device 404 based, for example, on publish-subscribe functionality. The publish-subscribe functionality may be implemented in accordance with an Extensible Messaging and Presence Protocol (XMPP) based infrastructure and may potentially employ different messaging formats and repeaters. However, any suitable infrastructure for implementing the publish-subscribe functionality and/or any other mechanism for communicating consumption event information may be utilized.

In one or more embodiments, the second consumption device 404 may transmit a subscription request 414 to the content consumption platform 106 to receive notifications from the content consumption platform 106 associated with consumption events occurring on content consumption devices 126 identified in the subscription request. Upon acceptance of the subscription request 414, the content consumption platform 106 may transmit ("publish"), to the second consumption device 404, notifications 416 including consumption event information pertaining to consumption events associated with content consumption devices 126 to which the subscription relates. Upon receipt of consumption event information 416 from the content consumption platform 106, the second consumption device 404 may then distribute the consumption event information to other consumption devices within the content information network such as in those scenarios in which the second consumption device 404 is a consumption hub device.

In certain embodiments, a directed acyclic graph route (DAGR) may be used to coordinate communication between the content consumption platform 106 and various consumption devices including consumption hub devices as well as other consumption devices that do not serve as hubs. The DAGR may provide a representation of an optimal route as well as one or more backup routes between various end-points. A route table may be provided that specifies various network distances between end-points. The network distance may be normalized and/or represented as another parameter (e.g., time). The DAGR may be utilized to communicate consumption event information between consumption devices and the content consumption platform 106. "Keep alive" messages may be used to continuously validation network distances and, if necessary, re-determine network distances between end-points as networks (e.g., content information networks) dynamically reform as consumption devices enter and leave the networks.

Illustrative Processes

Figure 5:
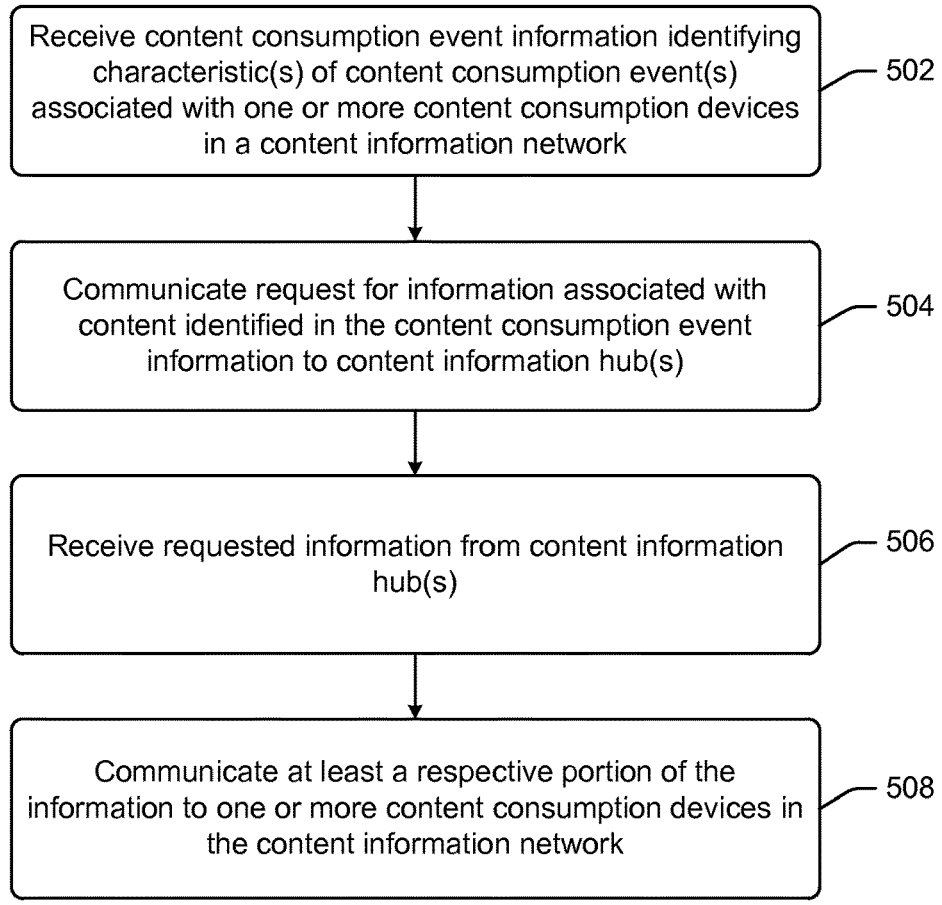
FIG. 5 is a process flow diagram of illustrative functionality supported by a content consumption hub device in accordance with one or more embodiments of the disclosure.

FIG. 5 is a process flow diagram of illustrative functionality supported by a content consumption hub device in accordance with one or more embodiments of the disclosure. One or more operations of the illustrative method 500 depicted in FIG. 5 may be performed upon execution of computer-executable instructions provided as part of, for example, the CIS application 322, or more specifically, the content consumption hub module 324 included in the CIS application 322.

At block 502, consumption event information identifying one or more characteristics of one or more consumption events associated with one or more consumption devices in a content information network may be received. The consumption event information may be received, for example, by a consumption hub device forming part of the content information network.

At block 504, the consumption hub device that receives the consumption event information may communicate a request for content-related information relating to content identified in the consumption event information to one or more content information hubs. The request may include at least a portion of the consumption event information (e.g., content identifiers). The request may further include an identification of various users that have request the content-related information or for whom the information is being requested. As previously noted, the content information hub may utilize user profile information to identify various user preferences with respect to preferred types, formats, etc. of content. The content information hub may access or request the content-related information from one or more of content source servers.

At block 506, the consumption hub device may receive the content-related information from the content information hub, and at block 508, the consumption hub device may communicate at least a respective portion of the content-related information to one or more consumption devices in its content information network. In certain embodiments, the consumption hub device may facilitate communication of all of the received content-related information to each of the consumption devices within the content information network. As previously described, the consumption hub device may have direct connectivity to a subset of consumption devices within the content information network and information communicated to such consumption devices may then be propagated to other consumption devices in accordance with the mesh network configuration of the content information network.

It should be appreciated that the method 500 depicted in FIG. 5 is merely illustrative and that numerous variations are within the scope of this disclosure. For example, in various embodiments, the consumption hub device may request consumption event information pertaining to consumption events associated with consumption devices forming part of different content information networks and/or consumption devices not forming part of a content information network.

Figure 6:
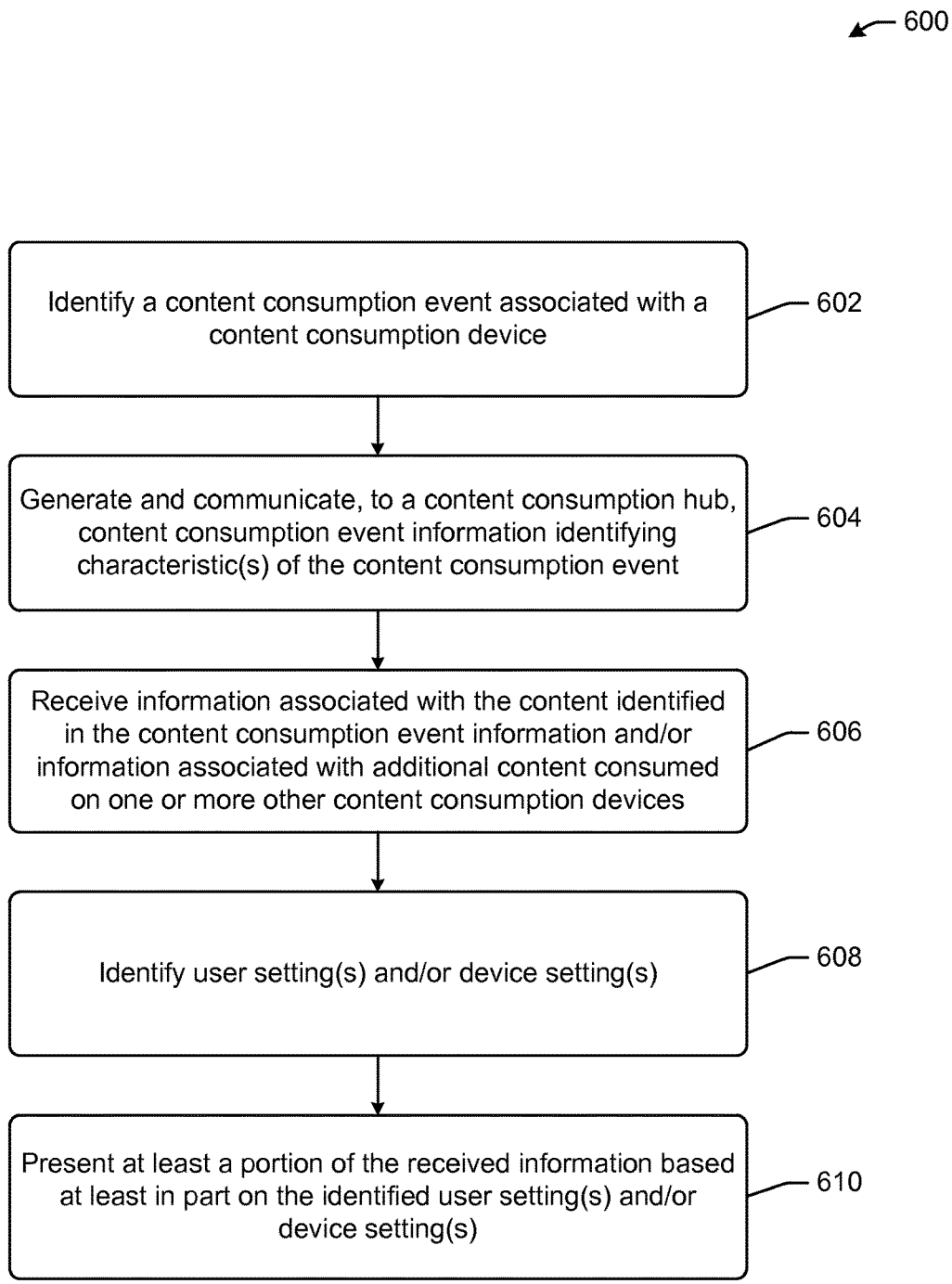
FIG. 6 is a process flow diagram of illustrative functionality supported by a content consumption device in accordance with one or more embodiments of the disclosure.

FIG. 6 is a process flow diagram of illustrative functionality supported by a content consumption device in accordance with one or more embodiments of the disclosure. One or more operations of the illustrative method 600 depicted in FIG. 6 may be performed upon execution of computer-executable instructions provided as part of, for example, the CIS application 322, or more specifically, the content consumption management module 326 and/or the content-related information presentation module 330.

At block 602, a consumption device forming part of a content information network may identify a consumption event occurring or which has occurred on the consumption device. The consumption event may correspond to any one or more user interactions involving the consumption or planned consumption of content on the consumption device and may include any of the types of consumption events previously described.

At block 604, the consumption device may gather and/or generate consumption event information identifying one or more characteristics of the detected consumption event and may communicate the consumption event information to a consumption hub device with which the consumption device is associated (e.g., a consumption hub device within the same content information network). The consumption event information may optionally be communicated in association with a request for content-related information relating to content identified in the consumption event information.

As previously described, upon receipt of the consumption event information, the consumption hub device may communicate a request for content-related information to the content information hub which may, in turn, access or receive the content-related information from one or more content source serves and provide the content-related information to the consumption hub device.

At block 606, the consumption device may receive content-related information relating to content consumed on the consumption device itself as well as, potentially, content-related information relating to content consumed on one or more other consumption devices that are either within the same content information network, within a different content information, or not within a content information network (e.g., not within a same network as a consumption hub device).

At block 608, the consumption device may identify one or more user settings associated with a user of the consumption device and/or one or more device settings associated with the consumption device. At block 610, at least a portion of the content-related information may be presented to the user in accordance with the identified user setting(s) and/or device setting(s). It should be appreciated that the method 600 depicted in FIG. 6 is merely illustrative and that numerous variations are within the scope of this disclosure.

Figure 7:
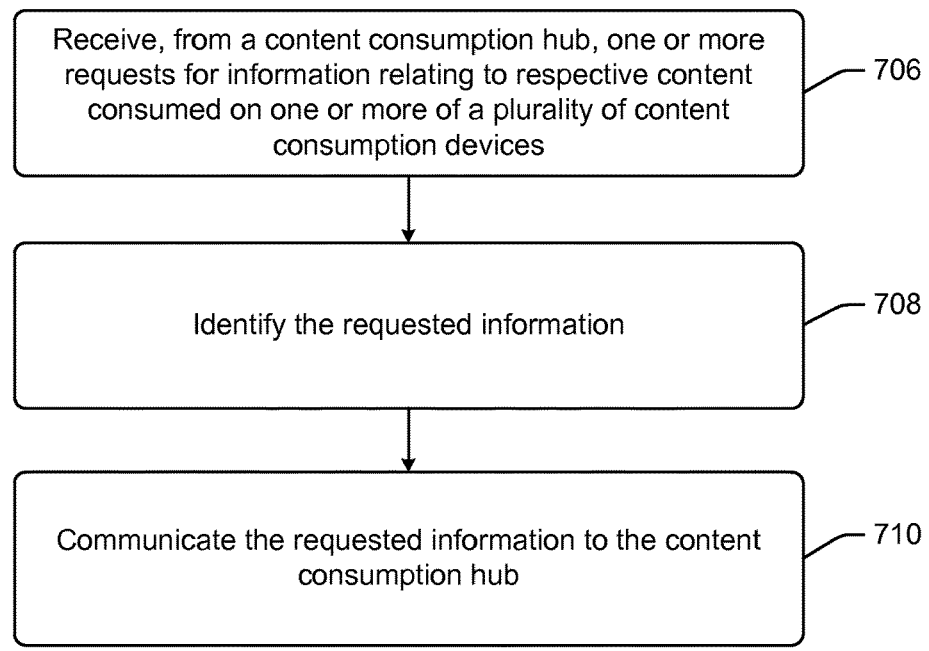
FIG. 7 is a process flow diagram of illustrative functionality supported by a content information hub device in accordance with one or more embodiments of the disclosure.

FIG. 7 is a process flow diagram of illustrative functionality supported by a content information hub device in accordance with one or more embodiments of the disclosure. One or more operations of the illustrative method 700 depicted in FIG. 7 may be performed upon execution of computer-executable instructions provided as part of, for example, the server application 346, or more specifically, the content-related information identification module 348.

At block 706, the content information hub may receive, from a consumption hub device, one or more requests for content-related information relating to respective content consumed on one or more of a plurality of consumption devices. The consumption devices may include devices that form part of a same content information network as the consumption hub device, devices that form part of one or more different content information networks, and/or devices that do not form part of a content information network (e.g., devices that are not associated with a consumption hub device).

At block 708, the content information hub may identify the requested content-related information. For example, the content information hub may retrieve or request the content-related information from one or more content source servers.

At block 710, the content information hub may communicate the requested content-related information to the request consumption hub device. As previously described, upon receipt, the consumption hub device may facilitate communication of the content-related information to consumption devices within its content information network.

It should be appreciated that the method 700 depicted in FIG. 7 is merely illustrative and that numerous variations are within the scope of this disclosure. For example, the information requested by the consumption hub device from the content information hub may be consumption event information pertaining to consumption events associated with consumption devices forming part of one or more different content information networks.

Figure 8:
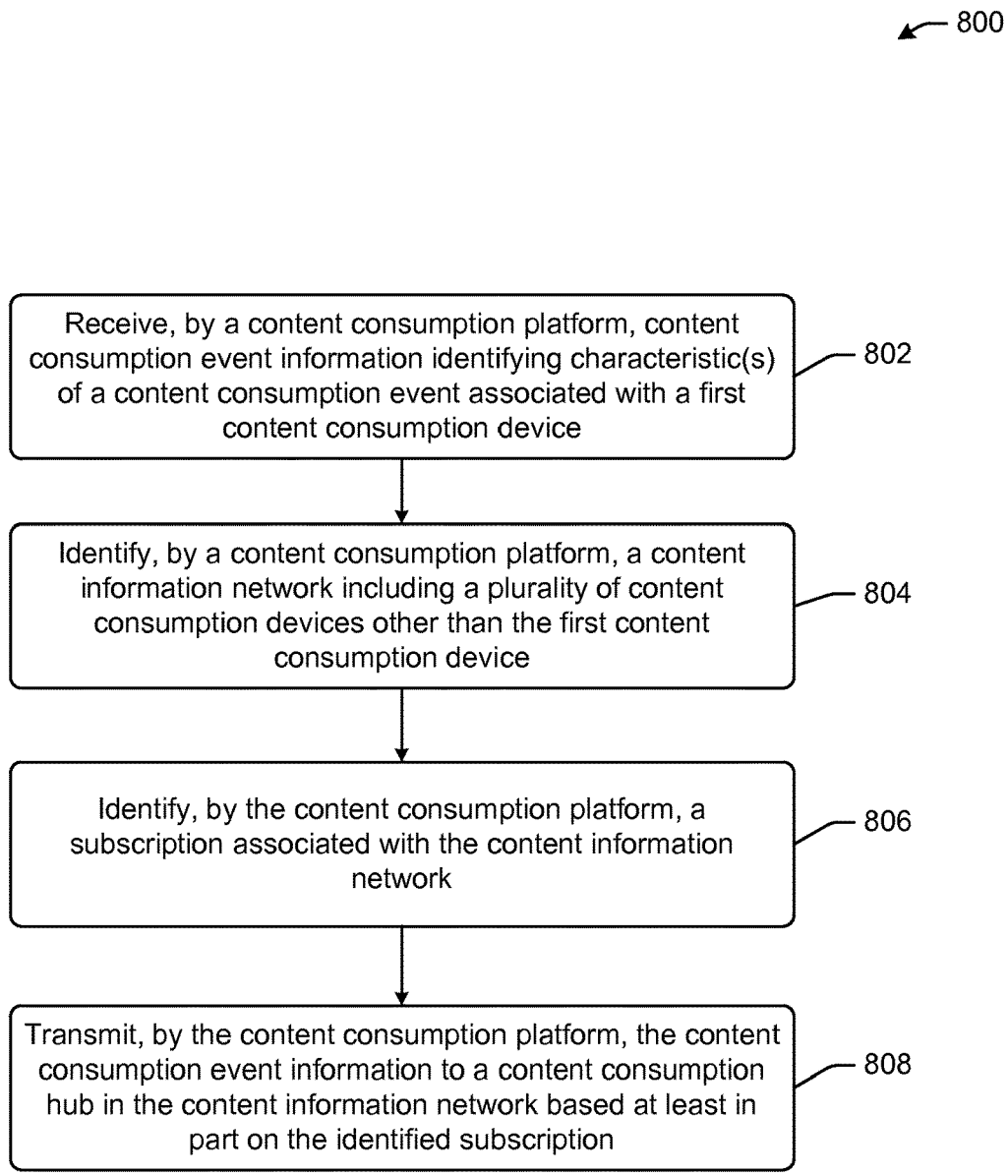
FIG. 8 is a process flow diagram of illustrative functionality supported by a content consumption platform in accordance with one or more embodiments of the disclosure.

FIG. 8 is a process flow diagram of illustrative functionality supported by a content consumption platform in accordance with one or more embodiments of the disclosure.

At block 802, a content consumption platform may receive consumption event information from a consumption device that identifies one or more characteristics of a consumption event associated with the consumption device. The consumption device may be, for example, one of the consumption devices 126 that is not part of a content information network, and thus is not capable of reporting the consumption event information to a consumption hub device. In certain embodiments, the consumption event information received at block 802 may be received via one or more content service portal(s) in accordance with any of illustrative mechanisms or methodologies described earlier.

At block 804, the content consumption platform may identify a content information network that includes a plurality of consumption devices other than the consumption device to which the consumption event information received at block 802 pertains.

At block 806, the content consumption platform may identify a subscription associated with the content information network identified at block 804. More specifically, the content consumption platform may identify a subscription associated with a consumption hub device of the content information network. The subscription may identify one or more consumption devices for which the consumption hub device has indicated a desire to receive associated consumption event information.

At block 808, the content consumption platform may transmit the consumption event information received at block 802 to the consumption hub device of the identified content information network based at least in part on the identified subscription. In this manner, the consumption hub device is made aware of consumption event activity associated with consumption devices that may not be able to report consumption event activity to associated consumption hub devices and which, as a result, are not able to communicate such consumption event activity to the content information hub for communication to the consumption hub device.

The operations described and depicted in the illustrative methods 500, 600, 700 and 800 of FIGS. 5-8 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 5-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM beyond those described previously that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Computer-readable communication media may include computer-readable instructions, program modules, or other data transmitted within a data signal, such as a carrier wave, or other transmission. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download. It is noted that, as used herein, CRSM does not include computer-readable communication media.

Although embodiments have been described in language specific to structural features and/or methodological acts, it is to be understood that the disclosure is not necessarily limited to the specific features or acts described. Rather, the specific features and acts are disclosed as illustrative forms of embodiments of the disclosure. Conditional language such as, for example, "can," "could," "might," or "may," unless specifically stated otherwise, or unless otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
receiving, by a content information hub device, from a content consumption hub device, a request for information relating to content consumed on a content consumption device, wherein the request for information relating to the content comprises at least a portion of content consumption event information, the content consumption event information comprising:
one or more characteristics of a content consumption event associated with the content, and
one or more temporal content location identifiers identifying one or more portions of content associated with the content consumption event,
wherein the content consumption event information comprises at least one of scheduling information associated with recording and storing the content on the content consumption device or one or more user actions associated with user manipulation of the presentation of the content on the content consumption device, and wherein the content consumption event information is provided to the content consumption hub device based at least in part on a user profile associated with the content consumption device that indicates that the information relating to the content is eligible for distribution to one or more other content consumption devices, the user profile comprising information identifying one or more user preferences associated with at least a content format;
determining, by the content information hub device, that the content consumption hub device and the content information hub device are associated with a same content information network, wherein the content information network comprises a partial virtual mesh network of consumption devices;
identifying, by the content information hub device, the information relating to the content; and
transmitting, by the content information hub device to the content consumption hub device and based at least in part on determining that the content information hub device and the content consumption hub device are associated with the same content information network, the information relating to the content.

2. The method of claim 1, wherein the content consumption event is associated with the content consumption device on which the content is consumed.

3. The method of claim 1, wherein the request for the information relating to the content is a first request, and wherein identifying the information relating to the content comprises:
transmitting, by the content information hub device, a second request for the information relating to the content to one or more content information source servers; and
receiving, by the content information hub device, from at least one of the one or more content information source servers, the information relating to the content.

4. The method of claim 1, wherein the request for information relating to the content comprises one or more identifiers associated with one or more users, and wherein identifying the information relating to the content comprises:
identifying, by the content information hub device, one or more user profiles associated with the one or more users based at least in part on the one or more identifiers; and
identifying, by the content information hub device, the information relating to the content based at least in part on the one or more user profiles.

5. The method of claim 1, wherein the information relating to the content comprises at least one of:
i) metadata associated with the content, or
ii) additional content that is related to the content.

6. The method of claim 1, wherein the request for the information relating to the content is a first request and the content consumption device is a first content consumption device, and wherein the content consumption event information is first content consumption event information and the content consumption event is a first content consumption event, the method further comprising:
receiving, by the content information hub device, from the content consumption hub device, a second request for second content consumption event information identifying one or more characteristics of a second content consumption event associated with a second content consumption device;
identifying, by the content information hub device, the second content consumption event information; and
transmitting, by the content information hub device, the second content consumption event information to the content consumption hub device.

7. A content information hub device, comprising:
at least one memory storing computer-executable instructions; and
at least one processor configured to access the at least one memory and execute the computer-executable instructions to:
receive, from a content consumption hub device, a request for information relating to content consumed on a content consumption device, wherein the request for information relating to the content comprises at least a portion of content consumption event information, the content consumption event comprising:
one or more characteristics of a content consumption event associated with the content, and
one or more temporal content location identifiers identifying one or more portions of content associated with the content consumption event,
wherein the content consumption event information comprises at least one of scheduling information associated with recording and storing the content on the content consumption device or one or more user actions associated with user manipulation of presentation of the content on the content consumption device, and wherein the content consumption event information is provided to the content consumption hub device based at least in part on a user profile associated with the content consumption device that indicates that the information relating to the content is eligible for distribution to one or more other content consumption devices, the user profile comprising information identifying one or more user preferences associated with at least a content format;
determine that the content consumption hub device and the content information hub device are associated with a same content information network, wherein the content information network comprises a partial virtual mesh network of consumption devices;
identify the information relating to the content; and
transmit the information relating to the content to the content consumption hub device based at least in part on determining that the content consumption hub device and the content information hub device are associated with the same content information network.

8. The content information hub device of claim 7, wherein the request for the information relating to the content is a first request and the content consumption device is a first content consumption device, wherein the content consumption event information is first content consumption event information and the content consumption event is a first content consumption event, and wherein the at least one processor is further configured to execute the computer-executable instructions to:
receive, from the content consumption hub device, a second request for second content consumption event information identifying one or more characteristics of a second content consumption event associated with a second content consumption device;
identify the second content consumption event information; and
transmit the second content consumption event information to the content consumption hub device.

9. The content information hub device of claim 8, wherein the content consumption hub device is a first content consumption hub device, and wherein the at least one processor is further configured to execute the computer-executable instructions to:
receive, from the second content consumption device, the second content consumption event information.

10. A content consumption platform, comprising:
one or more computers comprising:
at least one memory storing computer-executable instructions; and
at least one processor configured to access the at least one memory and to execute the computer-executable instructions to:
identify a content information network comprising a plurality of content consumption devices comprising a first content consumption device and a second content consumption device, wherein the content information network comprises a partial virtual mesh network of the plurality of content consumption devices;
receive a content consumption event subscription request from the second content consumption device;
determine that the first content consumption device and the second content consumption device are associated with the content information network;
associate a content consumption subscription with the second content consumption device, the content consumption subscription indicating that notifications indicative of content consumption events associated with the first content consumption device are to be transmitted to the second content consumption device;
receive content consumption event information, the content consumption event information comprising:
one or more characteristics of a particular content consumption event associated with content consumed on the first content consumption device, and
one or more temporal content location identifiers identifying one or more portions of content associated with the content consumption event,
wherein the content consumption event information comprises at least one of scheduling information associated with recording and storing the content on the first content consumption device or one or more user actions associated with user manipulation of presentation of the content on the first content consumption device;
generate a first notification comprising the content consumption event information; and
communicate, based at least in part on determining that the first content consumption device and the second content consumption device are associated with the content information network, the first notification to the second content consumption device, the communication of the first notification comprising one or more messages that validate network distances between the first content consumption device and the second content consumption device.

11. The content consumption platform of claim 10, wherein the content consumption event information comprises an identifier associated with the first content consumption device and an identifier associated with the consumed content.

12. The content consumption platform of claim 11, wherein the content consumption event information further comprises a classification associated with the particular content consumption event.

13. The content consumption platform of claim 10, wherein the second content consumption device is a content consumption hub device of the content information network, and wherein the content consumption hub device is configured to facilitate communication of the content consumption event information to each other content consumption device of the plurality of content consumption devices of the content information network.

14. The content consumption platform of claim 10, wherein the at least one processor is further configured to execute the computer-executable instructions to:
communicate the content consumption event information to one or more analytics platforms.

15. The content consumption platform of claim 10, wherein the content consumption event information is received from one or more content service portals.

16. The content consumption platform of claim 10, wherein the particular content consumption event is a first content consumption event and the content consumption event information is first content consumption event information, and wherein the at least one processor is further configured to execute the computer-executable instructions to:
receive, from the second content consumption device, second content consumption event information identifying one or more characteristics of a second content consumption event associated with content consumed on a third content consumption device of the plurality of content consumption devices of the content information network; and
communicate, to the first content consumption device, the second content consumption event information.

17. The content consumption platform of claim 10, wherein the at least one processor is further configured to execute the computer-executable instructions to:
transmit, to at least one of: i) a content source portal or ii) a content information source server, the content consumption event information.

18. A method, comprising:
identifying, by a content consumption platform, a content information network comprising a plurality of content consumption devices comprising a first content consumption device and a second content consumption device, wherein the content information network comprises a partial virtual mesh network of the plurality of content consumption devices;
receiving, by the content consumption platform, a content consumption event subscription request from the second content consumption device;
determining, by the content consumption platform, that the first content consumption device and the second content consumption device are associated with the content information network;
associating, by the content consumption platform, a content consumption subscription with the second content consumption device, the content consumption subscription indicating that notifications indicative of content consumption events associated with the first content consumption device are to be transmitted to the second content consumption device;
receiving, by the content consumption platform, content consumption event information, the content consumption event information comprising:
one or more characteristics of a particular content consumption event associated with content consumed on the first content consumption device, and
one or more temporal content location identifiers identifying one or more portions of content associated with the content consumption event,
wherein the content consumption event information comprises at least one of scheduling information associated with recording and storing the content on the first content consumption device or one or more user actions associated with user manipulation of presentation of the content on the first content consumption device;
generating, by the content consumption platform, a first notification comprising the content consumption event information; and
communicating, by the content consumption platform based at least in part on determining that the first content consumption device and the second content consumption device are associated with the content information network, the first notification to the second content consumption device, the communication of the first notification comprising one or more messages that validate network distances between the first content consumption device and the second content consumption device.

19. The method of claim 18, wherein the content consumption event information comprises an identifier associated with the first content consumption device and an identifier associated with the consumed content.

20. The method of claim 19, wherein the content consumption event information further comprises a classification associated with the content consumption event.

21. The method of claim 18, further comprising:
receiving, by the content consumption platform, the content consumption event information from one or more content service portals.

22. The method of claim 18, wherein the particular content consumption event is a first content consumption event and the content consumption event information is first content consumption event information, the method further comprising:
receiving, by the content consumption platform, from the second content consumption device, second content consumption event information identifying one or more characteristics of a second content consumption event associated with content consumed on a third content consumption device of the plurality of content consumption devices of the content information network; and
communicating, by the content consumption platform, to the first content consumption device, the second content consumption event information.

23. The method of claim 18, further comprising:
transmitting, by the content consumption platform, to at least one of: i) a content source portal or ii) a content information source server, the content consumption event information.

* * * * *